United States Patent
Kawame et al.

(10) Patent No.: US 9,492,863 B2
(45) Date of Patent: Nov. 15, 2016

(54) METAL COMPONENT COUPLING STRUCTURE AND DEVICE

(75) Inventors: Nobuyuki Kawame, Kanagawa (JP); Hiroya Murakami, Nagano (JP)

(73) Assignee: KEIHIN SEIMITSU KOGYO CO., LTD., Yokohama-shi, Kanagawa (JP)

( * ) Notice: Subject to any disclaimer, the term of this patent is extended or adjusted under 35 U.S.C. 154(b) by 843 days.

(21) Appl. No.: 13/636,717

(22) PCT Filed: Mar. 24, 2011

(86) PCT No.: PCT/JP2011/001738
§ 371 (c)(1),
(2), (4) Date: Sep. 24, 2012

(87) PCT Pub. No.: WO2011/118219
PCT Pub. Date: Sep. 29, 2011

(65) Prior Publication Data
US 2013/0011186 A1   Jan. 10, 2013

(30) Foreign Application Priority Data

Mar. 26, 2010   (JP) ................................ 2010-071476

(51) Int. Cl.
*B25B 1/24*   (2006.01)
*B21K 25/00*   (2006.01)
*B23P 11/00*   (2006.01)

(52) U.S. Cl.
CPC ............... *B21K 25/00* (2013.01); *B23P 11/00* (2013.01); *Y10T 403/4949* (2015.01)

(58) Field of Classification Search
USPC ........................................ 29/283.5, 515, 520
See application file for complete search history.

(56) References Cited

U.S. PATENT DOCUMENTS

| | | | | |
|---|---|---|---|---|
| 8,739,385 B2* | 6/2014 | Verardo | ................ | G04B 13/02 29/520 |
| 2013/0309446 A1* | 11/2013 | Conus | ................ | G04B 13/022 428/135 |

FOREIGN PATENT DOCUMENTS

| | | | |
|---|---|---|---|
| JP | 62-058003 A | 3/1987 |
| JP | H03-106533 A | 5/1991 |
| JP | 05-318019 A | 12/1993 |
| JP | H05-318019 A | 12/1993 |

(Continued)

OTHER PUBLICATIONS

English translation of International Preliminary Report on Patentability (Chapter I) dated Nov. 1, 2012.

(Continued)

*Primary Examiner* — Joseph J Hail
*Assistant Examiner* — Shantese McDonald
(74) *Attorney, Agent, or Firm* — Posz Law Group, PLC

(57) ABSTRACT

A metal member coupling structure and a metal member coupling device that can perform high-strength and high-precision coupling are provided. A shaft-like portion of the second metal member is fitted in an annular portion of the first metal member, a restraint ring is disposed on the outer peripheral portion of the annular portion of the first metal member, and the annular portion is pressed to be plastically deformed, whereby the annular portion is made to flow into a coupling groove of the shaft-like portion and the first metal member and the second metal member are coupled to each other through mechanical engagement therebetween.

10 Claims, 10 Drawing Sheets

(A)

(B)

(56) References Cited

FOREIGN PATENT DOCUMENTS

| JP | 2000-024842 A |   | 1/2000  |            |
|----|---------------|---|---------|------------|
| JP | 2002-295504   | * | 9/2002  | B21D 39/00 |
| JP | 2002-295504 A |   | 10/2002 |            |
| JP | 2003-311547 A | * | 5/2003  | B23P 11/02 |
| JP | 2003-311547 A |   | 11/2003 |            |

OTHER PUBLICATIONS

Office Action dated Nov. 4, 2014 issued in corresponding CN patent application No. 201180016310.7 (and English translation).
Office Action mailed Nov. 25, 2014 issued in corresponding JP patent application No. 2012-506856 (and English translation).
Office Action issued Mar. 4, 2014 in corresponding CN Application No. 201180016310.7 (and English translation).
Office Action mailed Apr. 30, 2015 in the corresponding CN application No. 201180016310.7 (with English translation).
The International Search Report of the International Searching Authority mailed May 31, 2011 for the corresponding international application No. PCT/JP2011/001738 (with English translation).

* cited by examiner (A)

(B)

(A)

(B)

(A)

(B)

(A)

(B)

(C)

US 9,492,863 B2

METAL COMPONENT COUPLING STRUCTURE AND DEVICE

CROSS REFERENCE TO RELATED APPLICATIONS

This application is a U.S. national stage application of PCT/JP2011/001738 filed on Mar. 24, 2011, and claims priority to, and incorporates by reference, Japanese Patent Application No. 2010-071476 filed on Mar. 26, 2010.

TECHNICAL FIELD

The present invention relates to metal member coupling structure and device using plastic flow coupling.

BACKGROUND ART

In order to fixedly fit a shaft-like metal member into an annular portion of a housing formed of metal, a holder portion is integrally formed along the outer peripheral edge of the shaft-like metal member, and the holder portion is fastened to the housing by a bolt. However, the weight and cost of the member increase because the holder portion is formed. Furthermore, the productivity for mass production is low because bolting is carried out. Accordingly, a method of coupling metals by plastically deforming the metals is known (see Patent Document 1, for example).

PRIOR ART DOCUMENT

Patent Document

Patent Document 1: JP-A-5-318109

SUMMARY OF THE INVENTION

Problem to be Solved by the Invention

However, in order to obtain high coupling strength for the coupling of metal members by using plastic flow coupling, it is required to increase the load to be applied for pressing, so that there is a problem that the material constituting the housing side to be pressed is limited to a material having a high mechanical strength.

Furthermore, during the process of coupling two members, these members are pressed while a large load is applied to one of the members, so that the relative position between both the members to be coupled varies unavoidably. Therefore, it is difficult to couple the members with high precision.

The present invention has been implemented in view of the foregoing situation, and has an object to provide a metal member coupling structure and a metal member coupling device that can perform high-strength and high-precision coupling of metal members by using plastic flow coupling.

Means of Solving the Problem

In order to attain the above object, the present invention is characterized in a second metal member containing a shaft-like portion having a coupling groove formed on a peripheral portion thereof is fitted to a first metal member having an annular portion so that the shaft-like portion is engaged with the annular portion, a restraint ring is disposed on an outer peripheral portion of the annular portion of the first metal member, the annular portion is pressed and plastically deformed to make the annular portion flow into the coupling groove of the shaft-like portion, whereby the first metal member and the second metal member are coupled to each other through mechanical engagement therebetween.

According to this construction, even when the thickness of the annular portion is small, the annular portion can be reinforced from the outer peripheral portion thereof by the restraint ring, and the annular portion can be made to plastically flow into the coupling groove of the shaft-like portion so that the annular portion is coupled to the shaft-like portion. Furthermore, even when the annular portion is formed of a material having high degree of hardness or a material having low ductility, the annular portion is reinforced from the outer peripheral portion thereof by the restraint ring, whereby the swelling in the outer peripheral direction of the annular portion is restrained and the annular portion is made to efficiently plastically flow into the coupling groove of the shaft-like portion, thereby attaining high coupling strength. Furthermore, since the annular portion is fixed from the outer periphery thereof by the restraint ring, variation of the relative position between the axial center of the annular portion and the axial center of the shaft-like portion can be prevented even when a large load is applied to the annular portion. Therefore, high-precision coupling can be performed. Still furthermore, the coupling based on mechanical engagement brings high shear strength in the axial direction and high strength in the rotational direction based the residual strength under plastic flow coupling, so that high-strength coupling can be performed.

In this construction, the first metal member may be an aluminum die-cast product, and the annular portion is a thin-walled portion of 2 mm or more in thickness.

According to this construction, the thin-walled portion of the aluminum die-cast product having high degree of hardness can be made to plastically flow without being fractured, so that high-strength coupling can be performed. Therefore, it is unnecessary that a holder portion is formed integrally with the shaft-like portion of the shaft-like second metal member and the holder portion is fastened to the first metal member formed by the aluminum die case through bolts as in the case of prior arts. Therefore, the weight of the metal member can be reduced, and the cost can be reduced. Furthermore, the plastic flow coupling can be used, and thus the productivity can be enhanced.

In this construction, a ring member having a smaller thermal expansion coefficient and higher rigidity than the annular portion may be fitted to the outer periphery of the annular portion.

According to this construction, the ring member having a smaller thermal expansion coefficient than the annular portion is fitted to the outer periphery of the annular portion. Therefore, even when this metal member coupling structure is applied to a part used under high-temperature and vibration environment such as an engine part or the like, the reduction of the fastening force between the first metal member and the second metal member due to the difference in thermal expansion therebetween under high temperature can be suppressed. In addition, since the ring member is formed of a material having higher rigidity than the annular portion, the ring member protects the annular portion from the outside thereof, so that the durability of the metal member coupling structure can be secured.

In this construction, the coupling groove may comprise lateral grooves extending over plural streaks in a peripheral direction of the shaft-like portion, and a plurality of longitudinal grooves that are formed on some land portion so as to extend in an axial direction and arranged so as to be spaced from one another in the peripheral direction.

According to this construction, not only the lateral grooves extending in the peripheral direction, but also the plural longitudinal grooves like tooth grooves are formed on the outer periphery of the shaft-like portion. Therefore, for example when this metal member coupling structure is applied to a part in which the rotational force in the peripheral direction greatly acts on the shaft-like portion or the like, the annular portion is made to plastically flow into the longitudinal grooves, whereby it serves as a stopper for stopping the rotation in the peripheral direction and thus the coupling strength can be enhanced.

Furthermore, the present invention is characterized by comprising:

a die mechanism for holding a first metal member having an annular portion and a second metal member containing a shaft-like portion having a coupling groove on an outer peripheral portion thereof under a state that the shaft-like portion of the second metal member is fitted in the annular portion of the first metal member;

a restraint ring disposed on an outer peripheral portion of the annular portion of the first metal member; and a punch mechanism for pressing the annular portion under a state that the outer peripheral portion of the annular portion of the first metal member is restrained by the restraint ring, wherein the annular portion is pressed and plastically deformed by the punch mechanism to make the annular portion flow into the coupling groove of the shaft-like portion, whereby the first metal member and the second metal member are coupled to each other through mechanical engagement therebetween.

According to this construction, the spreading in the outer peripheral direction of the annular portion can be prevented. For example when the annular portion of the first metal member is a thin-walled portion of an aluminum die-cast product, the annular portion can be prevented from being fractured by the press of the punch mechanism. Furthermore, the plastically deformed annular portion can be made to efficiently flow into the coupling groove. In addition, the displacement of the annular portion and the shaft-like portion fitted in the annular portion can be prevented by the restraint ring, and high-precision coupling can be performed.

In this construction, the restraint ring may be disposed in the punch mechanism. According to this construction, the restraint ring may be disposed in the punch mechanism. According to this construction, in the mass production process, the restrain ring can be automatically released from the annular portion of the first metal member by upwardly moving the punch mechanism. Therefore, the high-precision and high-strength coupling between the annular portion and the shaft-like portion can be performed by using the restrain ring without requiring any labor for attachment/detachment of the restrain ring.

In this construction, a ring member having a smaller thermal expansion coefficient and higher rigidity than the annular portion may be fitted to the outer periphery of the annular portion, and the restraint ring may be disposed on an outer peripheral portion of the ring member.

According to this construction, the ring member having the smaller thermal expansion coefficient than the annular portion is fitted to the outer periphery of the annular portion. Therefore, even when the metal member coupling structure is applied to a part used under high-temperature and vibration environment such as an engine part or the like, the reduction of the fastening force due to the difference in thermal expansion between the first metal member and the second metal member under high temperature can be reduced. In addition, the ring member is formed of a material having higher rigidity than the annular portion, and thus the ring member protects the annular portion from the outside thereof, so that the durability of the metal member coupling structure can be secured.

In this construction, the coupling groove may comprise lateral grooves extending over plural streaks in a peripheral direction of the shaft-like portion, and a plurality of longitudinal grooves that are formed on a land portion so as to extend in an axial direction and arranged so as to be spaced from one another in the peripheral direction.

According to this construction, not only the lateral grooves extending in the peripheral direction, but also the plural longitudinal grooves like tooth grooves are formed on the outer periphery of the shaft-like portion. Therefore, even when the metal member coupling structure is applied to a part in which the rotational force in the peripheral direction greatly acts on the shaft-like portion, the annular portion is made to plastically flow into the longitudinal grooves, whereby it serves as a stopper for stopping the rotation in the peripheral direction and thus the coupling strength can be enhanced.

Effect of the Invention

According to the present invention, even when the annular portion is thin-walled, the annular portion is reinforced from the outer peripheral portion by the restraint ring, and the annular portion is made to plastically flow into the coupling groove, whereby the annular portion and the shaft-like portion can be coupled to each other. Furthermore, even when the annular portion is formed of a material having high rigidity or a material having low ductility, the spreading of the annular portion in the outer peripheral direction can be restrained by reinforcing the annular portion from the outer peripheral portion thereof with the restraint ring, whereby the annular portion can be made to efficiently plastically flow into the coupling groove of the shaft-like portion and high coupling strength can be attained. Furthermore, the annular portion is fixed from the outer periphery thereof by the restraint ring. Therefore, even when the annular portion is pressed by applying a large load to the annular portion, the variation of the relative position between the axial center of the annular portion and the axial center of the shaft-like portion can be prevented, so that high-precision coupling can be performed.

MODES FOR CARRYING OUT THE INVENTION

Embodiments according to the present invention will be described hereunder with reference to the drawings.

Figure 1:
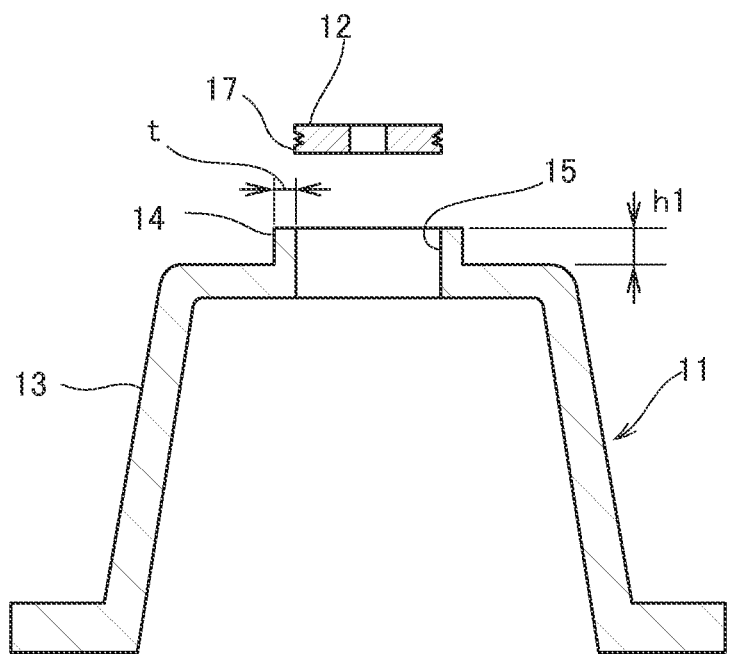
FIG. 1 A is a cross-sectional view showing a first metal member and a second metal member, and B shows an enlarged cross-sectional view showing a part of the second metal member.
Figure 1:
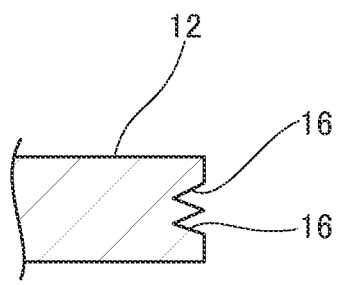

FIG. 1 shows an example of a first metal member 11 and a second metal member 12 to which a metal member coupling structure according to an embodiment is applicable. The shapes of the first metal member 11 and second metal member 12 shown in the figures of this embodiment are merely examples to describe this embodiment, and the applied members of this embodiment are not limited to these members.

The first metal member 11 is a metal housing, and has a main body portion 13 and an annular portion 14 which is formed integrally with the main body portion 13. An opening portion 15 is formed in the annular portion 14, and the annular portion 14 is a thick portion which is equal to 3 mm in thickness t and 6 mm in height h1. The first metal member 11 is a die-cast product molded by using aluminum alloy or the like, and it is formed of a material which is low in ductility.

The second metal member 12 is formed of a steel material such as steel or the like. In this embodiment, the whole portion is formed at a shaft-like portion 17. As shown in FIG. 1B with scale-up, plural annular coupling grooves 16 are formed along the outer peripheral surface of the shaft-like portion 17. In this embodiment, a steel ring having a spline hole or the like is assumed as the second metal member 12. However, the second metal member 12 is not limited to this ring, but it may be a shaft formed of a material having high rigidity or the like.

The outer diameter of the shaft-like portion 17 is set to substantially the same diameter as the opening portion 15 formed at the annular portion 14 of the first metal member 11 with a desired clearance. Furthermore, the first metal member 11 and the second metal member 12 are formed in advance so that the shaft-like portion 17 of the second metal member 12 is inserted in the opening portion 15 of the first metal member 11, and the axial center of the annular portion 14 and the axial center of the shaft-like portion 17 are coincident with each other with high precision when the first metal member 11 and the second metal member 12 are fitted to each other.

Figure 2:
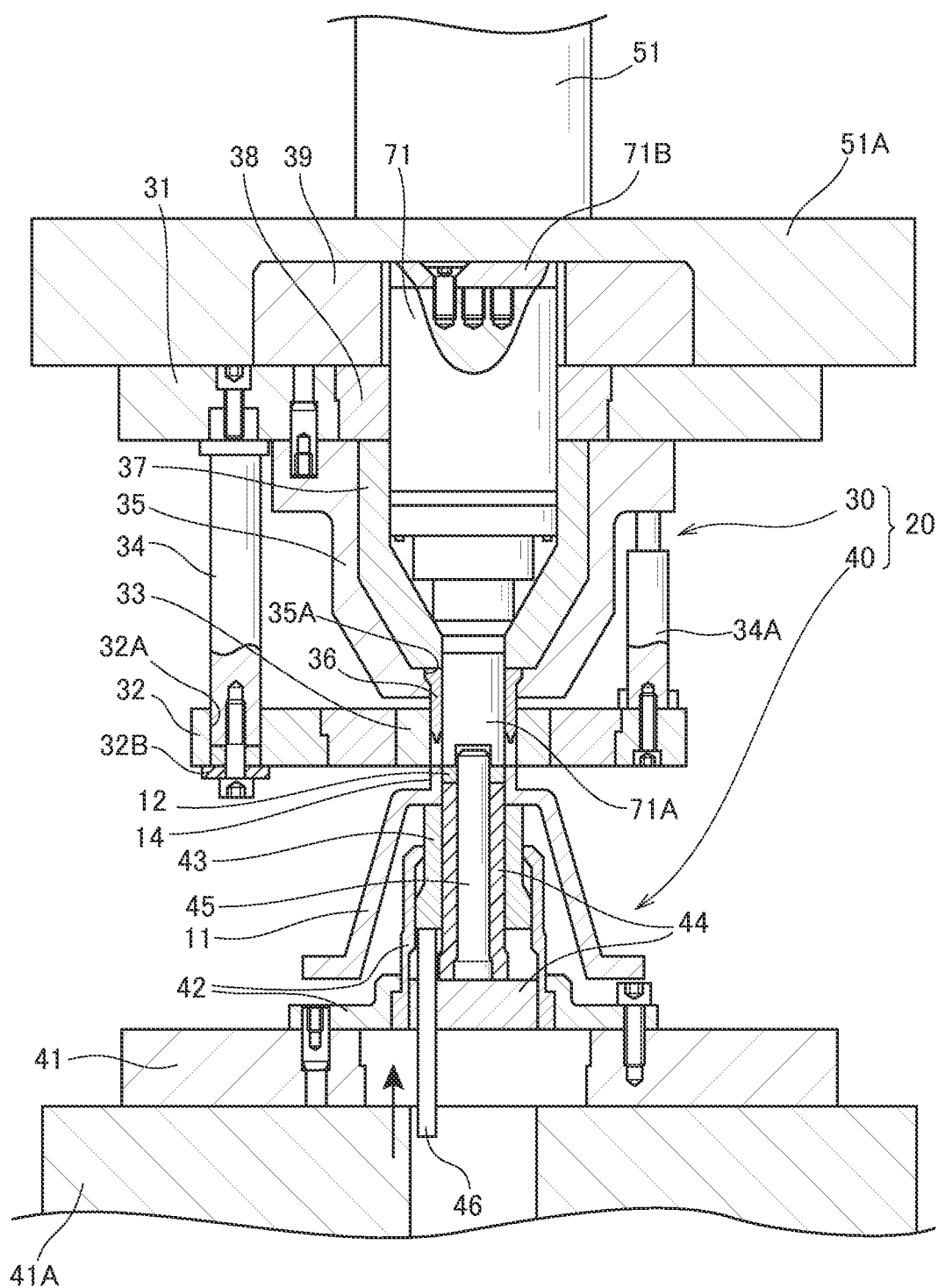
FIG. 2 is a cross-sectional view showing a metal member coupling device according to an embodiment.

FIG. 2 is a diagram showing a metal member coupling device 20 according to the embodiment. The metal member coupling device 20 is substantially constructed by a punch mechanism 30 and a die mechanism 40. The punch mechanism 30 is supported by a piston 51 of a hydraulic cylinder (actuator), and it is configured so that the whole body thereof is freely upwardly and downwardly movable. An upper base 51A is fixed to the lower end portion of the piston 51, and a punch base 31 is fixed to the upper base 51A.

The punch base 31 supports holders 38 and 39, and the holder 39 supports the upper end portion of a first gas spring 71. The first gas spring 71 freely elastically holds a press member 71A, and a cylindrical punch 36 is disposed around the press member 71A. The upper end portion of the cylindrical punch 36 comes into contact with the punch press member 37, the punch press member 37 is held by a punch positioning holder 35, and the punch positioning holder 35 is fixed to the punch base 31. A restraint ring 33 is disposed at the outer peripheral portion of the cylindrical punch 36, and the restraint ring 33 is formed integrally with the inner peripheral portion of a work press 32. The height h of the restraint ring (see FIG. 4) is set to be higher than the height h1 of at least the annular portion 14 of the first metal member 11 (see FIG. 1). Four holes 32A (only one hold is shown in FIG. 2) are formed on substantially diagonal lines in the work press 32, and guide posts 34 having high rigidity which are hung from the punch base 31 by rods having heads are fitted in these holes 32A. A guide flange 32B is joined to the lower end of the guide post 34 by a bolt. Furthermore, four second gas springs 34A (only one is illustrated) expanded upwardly are joined to the work press member 32 by bolts, and the upper end face of the second gas spring 34A comes into contact with the punch positioning holder 35.

The die mechanism 40 is configured to have a lower base 41A, a die base 41 fixed to the lower base 41A, a die holder 42 fixed to the die base 41, an outer die 43 which is held by the die holder 42 so as to be freely movable upwards and downwards, an inner die 44 which is fixedly held on the die holder 42, a cored bar 45 and a knock-out pin (knock-out jig) 46 which can urge the outer die 43 upwards.

Next, a series of operations of the metal member coupling device 20 and the process of the plastic flow coupling of the first metal member 11 and the second metal member 12 will be described with reference to FIGS. 2 to 5.

Studies of the plastic flow coupling have been promoted to enhance the manufacturing yield of high-strength members such as quenched products, etc. each of which comprises a shaft and a disc integral with the shaft and is frequently used as a machine part and also reduce the investment for facilities. It is general that a shaft-like member having a recess portion for coupling and a disc having a hole in which the shaft-like member is inserted are manufactured separately from each other, the shaft-like member is inserted into the disc, and the peripheral portion of the hole of the disc is pressurized to elastically deform the disc and make the plastically-deformed disc flow into the recess portion, thereby achieving the mechanical engagement between the two members, whereby the two members are coupled to each other. The aluminum die cast part exemplified in this embodiment is essential as a functional or structural part which is light in weight and has a complicated shape, and it is indispensably coupled with an iron type part for the purpose of abrasion-resistance and high endurance. However, the aluminum die cast part has low plastic deformation performance, and thus high coupling pressure is required to be applied to perform plastic flow coupling. Therefore, it is necessary to take a countermeasure of preventing occurrence of crack in the aluminum die-cast material having low ductility due to high coupling pressure.

Particularly, it is difficult to hold high coupling pressure for a thin-walled member such as the annular portion or the like of the housing formed of metal exemplified in this embodiment. However, the thin-walled annular portion 14 is reinforced from the outer periphery thereof by a restraint ring 33, and the annular portion 14 can be suppressed from spreading in the outer peripheral direction by coupling pressure, whereby occurrence of crack in the annular portion 14 can be prevented and the plastically deformed annular portion 14 can be made to flow into the coupling grooves 16 formed on the shaft-like portion 17.

First, the punch mechanism 30 is set to a state under which the punch mechanism 30 is upwardly moved to an upper limit value. Subsequently, as shown in FIG. 2, the first metal member 11 and the second metal member 12 are mounted on the die mechanism 40, and a piston 51 of the actuator is driven to start downward movement of the punch mechanism 30.

When the punch mechanism 30 is downwardly moved, the lower surface of the press member 71A comes into contact with the upper surface of the second metal member 12 as shown in FIG. 2. When the punch mechanism 3 continues to further move downwardly under the above state, the first gas spring 71 contracts, and for example a load of 3000 kg is applied to the second metal member 12 through the press member 71A by pre-charge pressure of the first gas spring 71, whereby the second metal member 12 is pressed against the inner die 44 from the upper side by the press member 71A.

Figure 3:
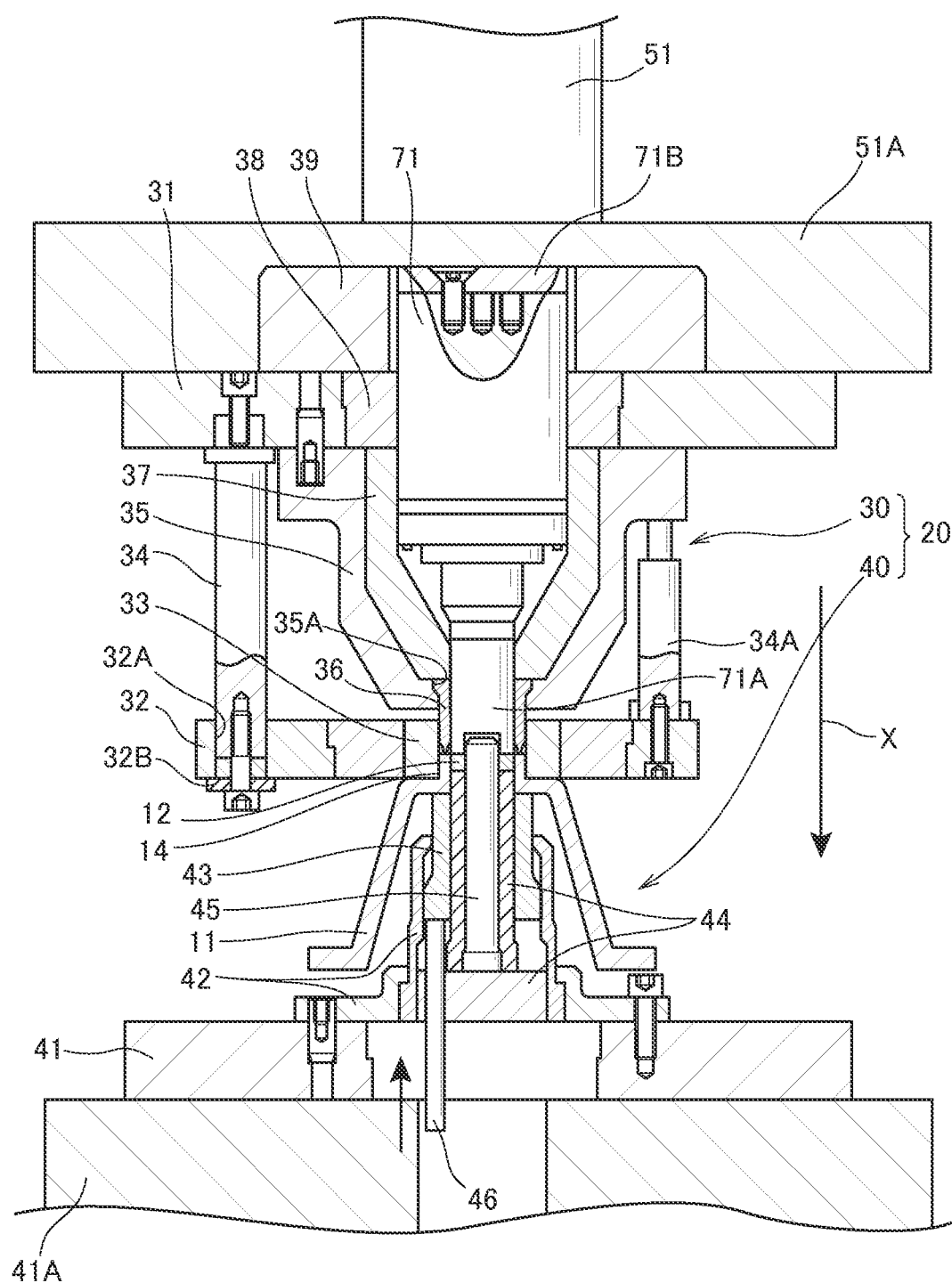
FIG. 3 is a cross-sectional view showing a state that a punch mechanism is downwardly moved.
Figure 4:
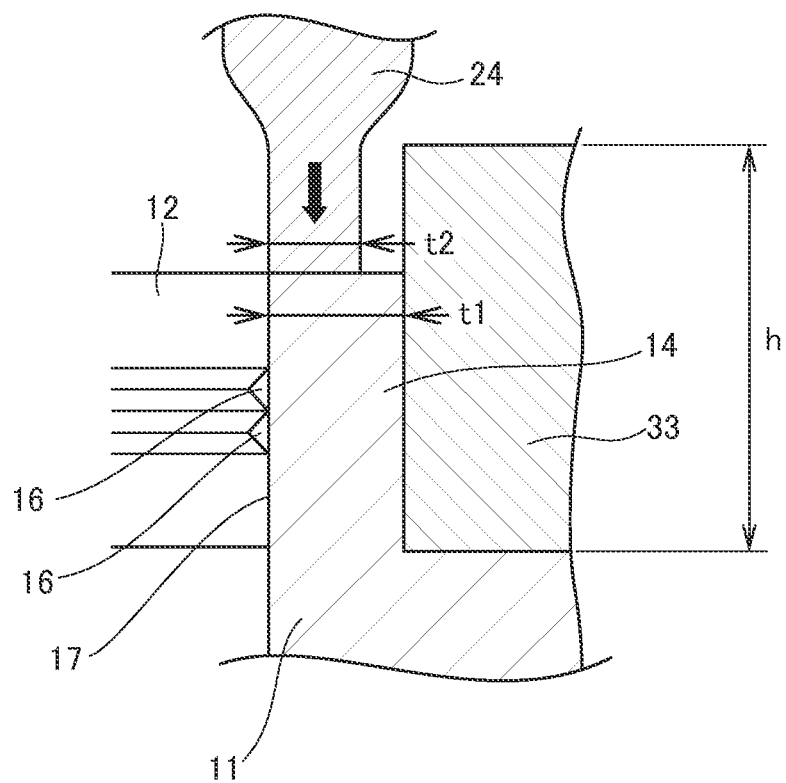
FIG. 4 is an enlarged view showing the coupling portion between the first metal member and the second metal member.

When the punch mechanism 30 continues to move downwardly under the state that the second metal member 12 is pressed by the press member 71A, as shown in FIG. 3, the punch mechanism 30 is downwardly moved, the restraint ring 33 is engagedly fitted along the outer periphery of the annular portion 14 of the first metal member 11, and the lower surface of the restraint ring 33 comes into contact with the surface of the first metal member 11. At this time, the punch 36 falls into a state that the tip portion of the punch 36 comes into contact with the upper surface of the annular portion 14 as shown in FIG. 4. When the punch mechanism 30 downwardly moves under this state as shown in FIG. 3, the second gas springs 34A joined to the work press 32 are contracted. The work press 32 presses the first metal member 11 against the outer die 43 from the upper side thereof by the pre-charge pressure of the second gas springs 34A. For example, a load of 170 kg (totally 680 kg) is applied to each of the four second gas springs 34A.

Figure 5:
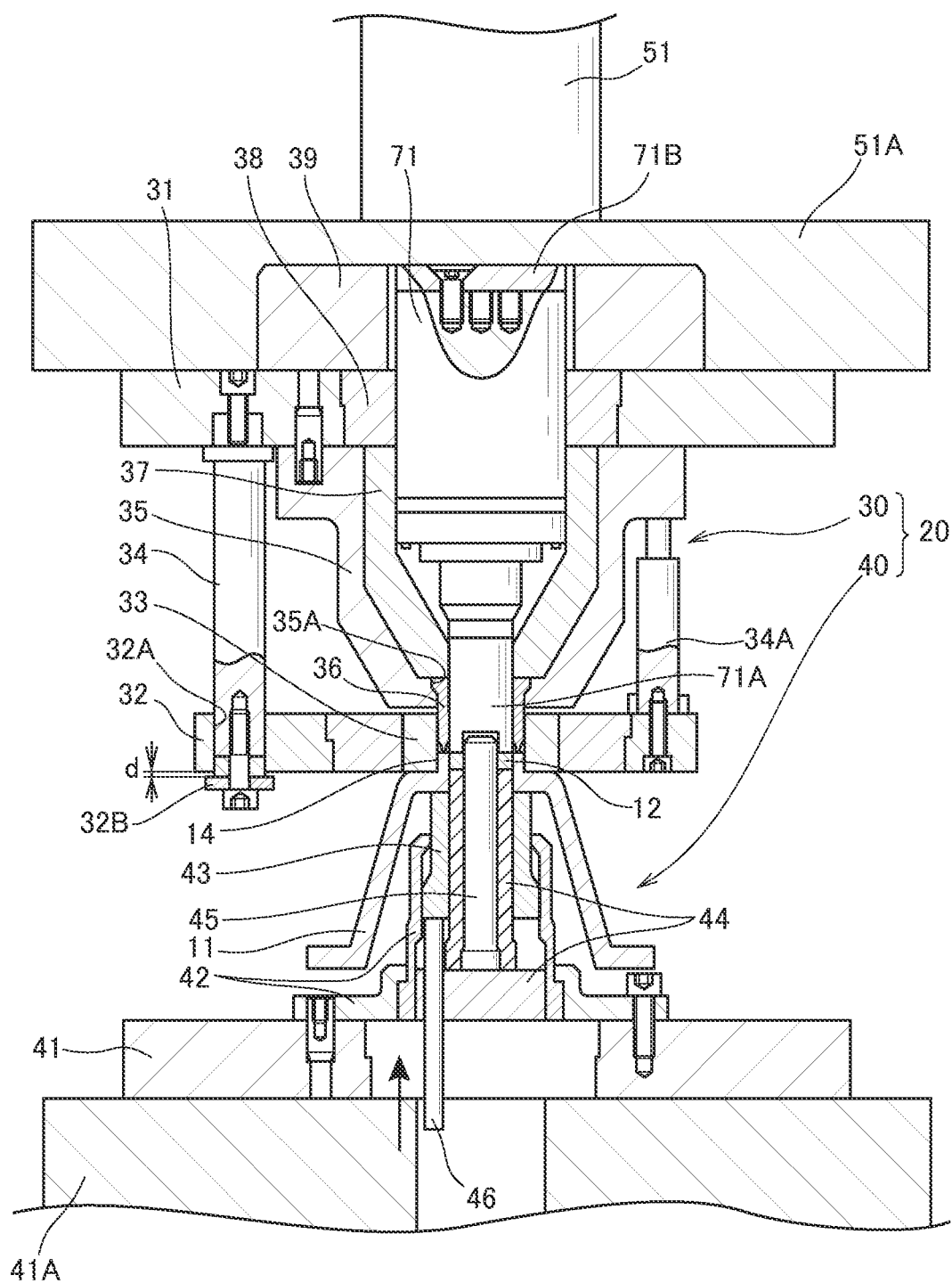
FIG. 5 is a cross-sectional view showing the process of the metal member coupling device.

When the punch mechanism 30 continues to further move downwardly under the state that the press member 71A and the work press 32 are pressed, a preset load is applied to the punch 36 through the punch press member 37 as shown in FIG. 5, and press force is applied to the annular portion 14 of the first metal member 11 by the load applied to the punch 36 as shown in FIG. 4.

The annular portion 14 is plastically deformed by the press force which is applied by the punch 36, and the plastically deformed annular portion 14 flows into the coupling grooves 16 formed on the second metal member 12 (plastic flow coupling). When the load applied to the punch 36 reaches a preset load, the downward movement of the punch mechanism 30 is stopped, and the punch 36 is pressed for a preset time while the load is applied to the punch 36. At this time, the second gas spring 34A is compressed by only a stroke d of the punch 36 (corresponding to the gap between the work press 32 and the guide flange 32B) as shown in FIG. 5, and the work press 32 is pushed back upwardly along the guide post 34 and kept to be floated from the guide flange 32B by only the stroke d of the punch 36.

When the plastic flow coupling between the first metal member 11 and the second metal member 12 is completed (the press time of the annular portion 14 elapses a preset time), a load (for example, 3000 kg is applied to the press member 71A and 680 kg is applied to the work press 32) is applied to the press member 71A and the work press 32. Under the state that the first metal member 11 and the second metal member 12 are pressed against the die mechanism 40, the punch 36 upwardly moves in connection with the upward movement of the punch mechanism 30, and the punch 36 is pulled out from the coupling portion between the annular portion 14 and the shaft-like portion 17. Furthermore, in connection with the upward movement of the punch 36, the push-back second gas springs 34A expand by the amount corresponding to the upward movement of the punch 36, whereby the contact between the punch 36 and the annular portion 14 is released, and at the same time, the work press 32 is fixed at the position of the guide flange 32B. Accordingly, under the state that the first metal member 11 and the second metal member 12 are pressed against the die mechanism 40, for example, by applying a load of 3000 kg to the press member 71A, the work press 32 starts to move upwardly together with the punch 36 in connection with the upward movement of the punch mechanism 30, and the restraint ring 33 releases from the annular portion 14.

The punch mechanism 30 continues to move upwardly, and the press member 71A releases from the die mechanism 40 in connection with the upward movement of the punch mechanism 30. When the punch mechanism 30 upwardly moves to the upper limit value of the metal member coupling device 20, the knock-out pin 46 provided to the die mechanism 40 is pushed up. Accordingly, the outer die 43 upwardly slides along the outer peripheral surface of the inner die 44, and the first metal member 11 is pushed up, so that the first metal member 11 and the second metal member 12 coupled to the first metal member 11 are released from the die mechanism 40.

As shown in FIG. 4, the punch 36 is disposed so that the inner periphery thereof is aligned with the inner periphery of the annular portion 14 when the tip thereof comes into contact with the annular portion 14.

Here, it has been experimentally verified that a desired coupled strength can be obtained by setting the punch width t2 of the punch 36 to 1.5 mm or more.

Figure 8:
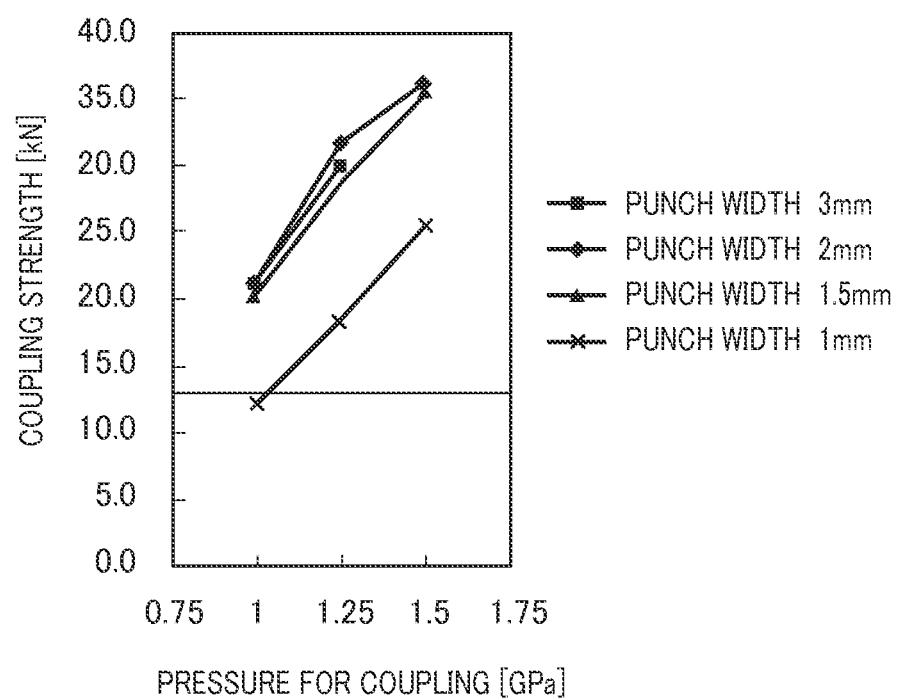
FIG. 8 is a diagram showing the relationship between the punch width and the coupling strength.

FIG. 8 shows an experimental result. When the punch width t2 is equal to 1 mm, the coupling strength is low irrespective of the pressure value under coupling. When the punch width t2 is equal to 1.5 mm, 2 mm, 3 mm, the coupling strength is high irrespective of the pressure value. Therefore, it is desirable that the thickness t1 of the annular portion 14 is larger than the punch width t2, that is, is equal to about 2 mm or more. It is desirable that the punch 36 is configured in a wedge-shape by angling the tip portion of the punch 36, easiness of pull-out of the punch 36 is considered and the material flow amount to the coupling grooves 16 is increased.

Figure 6:
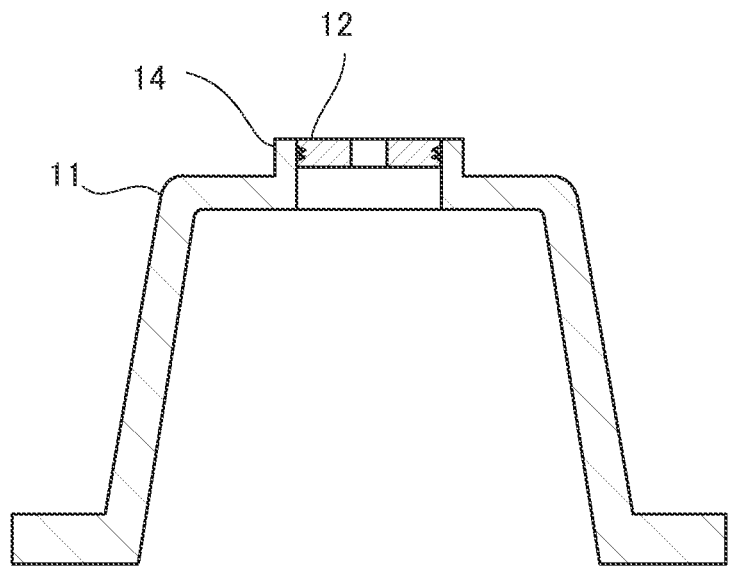
FIG. 6 A is a cross-sectional view showing metal members coupled by the embodiment, and B is an enlarged cross-sectional view showing a part of the second metal member.
Figure 6:
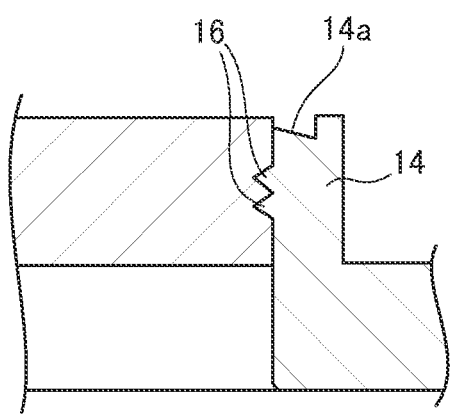

FIG. 6 is a cross-sectional view showing a metal part 10 manufactured by the metal member coupling device 20. The annular portion 14 which is pressed by the punch 36 and plastically deformed flows to the coupling grooves 16 and filled in the coupling grooves 16 as shown in FIG. 6B. As a result, the annular portion 14 and the shaft-like portion 17 are mechanically engaged with each other, so that the first metal member 11 and the second metal member 12 are coupled to each other.

The coupling faces of the coupling grooves 16 and the annular portion 14 are kept under a high frictional state by an action of residual stress based on the press of the punch 36. Therefore, high shear strength can be secured in the axial direction between the annular portion 14 and the shaft-like portion 17, and also the strength in the rotational direction based on the residual stress can be secured. Accordingly, high-strength coupling using the plastic flow of the annular portion can be performed. Furthermore, parts of projecting portions among plural annular coupling grooves 16 arranged along the outer peripheral surface of the shaft-like portion 17 are chipped off, and the plastically deformed annular portion 14 is made to flow to the chip-off portions to thereby prevent the shaft-like portion 17 from rotating relatively to the annular portion 14, whereby the coupling strength in the rotational direction of the metal part 10 can be further enhanced.

The first metal member 11 and the second metal member 12 are restrained by using the press member 71A and the restraint ring 33, whereby the first metal member 11 and the second metal member 12 can be coupled to each other without applying any load to the second metal member 12.

When the annular portion 14 of the first metal member 11 is pressed by applying a load to the annular portion 14, the restraint ring 33 restrains swelling (expansion) of the annular portion 14 in the outer peripheral direction, and the axial core of the shaft-like portion 17 is fixed by the core metal 45 of the die mechanism 40. Therefore, the annular portion 14 is plastically deformed without any deviation of the axial centers of the annular portion 14 and the shaft-like portion 17. Therefore, the relative position between the first metal member 11 and the second metal member 12 does not vary before and after the pressing, and the high-precision coupling between the first metal member 11 and the second metal member 12 (coaxiality degree: $\phi 0.02$ or less) can be implemented.

Furthermore, the shaft-like portion 17 of the second metal member 12 is formed so as to have high rigidity in advance, thereby preventing variation of the relative position between the first metal member 11 and the second metal member 12 due to the deformation of the second metal member 12 when the annular portion 14 is plastically deformed and flows into the coupling grooves 16.

The annular portion 14 is provided with a recess portion 14a formed at a portion which has come into contact with the bunch 36 as shown in FIG. 6 after the plastic deformation. When it is desired to form no recess portion 14a from the viewpoint of the characteristics of the metal part 10, a pushing margin may be formed at the annular portion 14, and the punch 36 may be brought into contact with the pushing margin to apply a load to the pushing margin, there pressing the annular portion 14.

Figure 7:
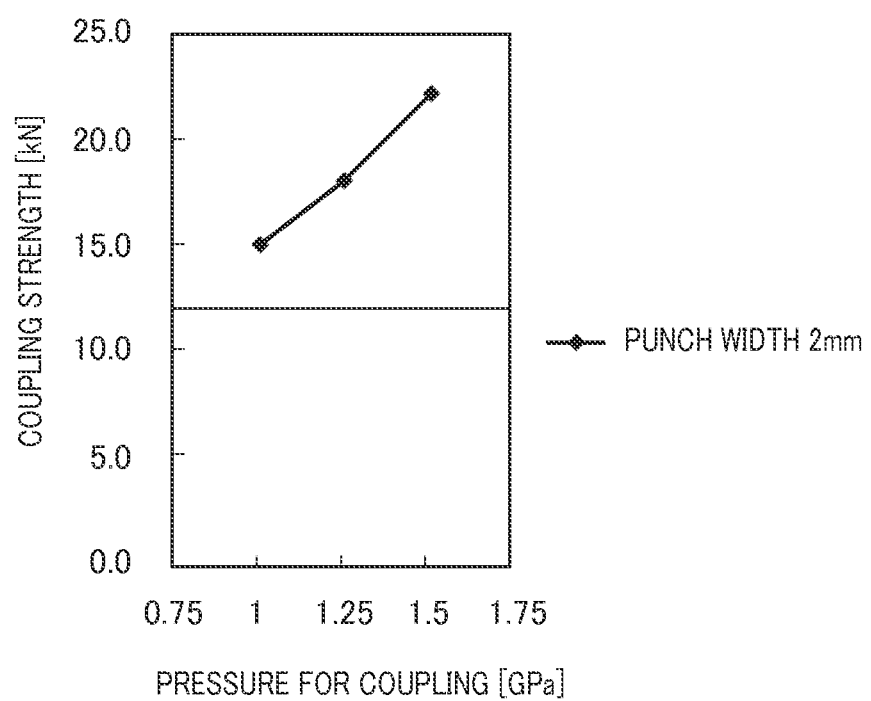
FIG. 7 is a diagram showing the coupling strength of the metal members coupled according to this embodiment.

FIG. 7 is a diagram showing the relationship between the pressure applied to the punch 36 and the coupling strength when a shaft-like portion 17 having two coupling grooves 16 of 0.5 mm in depth and 1 mm in width is coupled to an annular portion 14 of a first metal member 11 formed of aluminum die cast of 26 mm in outer diameter, 20 mm in inner diameter and 3 mm in thickness t1 by using a punch 36 of 2 mm in punch width t.

In this embodiment, as shown in FIG. 7, the coupling strength increases in proportion to the pressure applied to the punch 36. It is proved that when the pressure of 1.5 GPa is applied to the punch 36, the coupling strength of about 23 kN can be attained in the axial direction and the shaft-like portion 17 can be coupled to the thin-walled annular portion 14 formed of aluminum die cast by using plastic flow coupling without fracturing the annular portion 14.

According to this embodiment, the shaft-like portion 17 having the coupling grooves 16 of the second metal member 12 is fitted in the annular portion 14 of the first metal member 11, the restraint ring 33 is disposed on the outer peripheral portion of the annular portion 14 of the first metal member 11, and the annular portion 14 is pressed to be plastically deformed, whereby the annular portion 14 is made to flow into the coupling grooves 16 of the shaft-like portion 17 and the first metal member 11 and the second metal member 12 are coupled to each other through the mechanical engagement therebetween. Therefore, the annular portion 14 can be pressed without variation of the relative position between the annular portion 14 and the shaft-like portion 17, and thus high-precision coupling can be performed. Furthermore, the swelling of the annular portion 14 in the outer peripheral direction can be restrained, and thus the annular portion 14 can be made to efficiently flow into the coupling grooves 16 by pressing the annular portion 14, so that high coupling strength can be attained.

Furthermore, the annular portion 14 is plastically deformed so as to flow into the coupling grooves 16, and the first metal member 11 and the second metal member 12 are coupled to each other through the mechanical engagement therebetween, the weight of parts and the cost thereof can be reduced more greatly and the labor imposed on the manufacturing process can be reduced more greatly as compared with a case where a second metal member 12 is formed integrally with a holder and fastened to a first metal member 11 by bolts as in the case of prior arts. Furthermore, the first metal member 11 and the second metal member 12 are coupled to each other through the mechanical engagement therebetween. Therefore, high shear strength can be secured in the axial direction, and also high strength in the rotational direction based on the residual stress under plastic flow coupling can be secured, so that high-strength coupling can be attained.

According to this embodiment, the first metal member 11 is an aluminum die-cast product, and the annular portion 14 is a thin-walled portion of 2 mm or more in thickness, and a shaft-like member having high rigidity can be coupled to a thin-walled portion of an aluminum die cast product which has been hitherto difficult to be coupled by using plastic deformation.

Therefore, for example, when a ring formed of a steel member or the like is fixed to a thin-walled annular portion of a metal housing, it is unnecessary to form the ring integrally with a ring holder and threadably fixed to the housing with a bolt or the like, and thus a part can be miniaturized and the weight of the part can be greatly reduced. Furthermore, the productivity in mass production can be enhanced by using plastic flow coupling. Furthermore, according to this embodiment, the shaft-like portion 17 of the second metal member 12 is fitted in the annular portion 14 of the first metal member 11, and the restraint ring 33 is disposed on the outer peripheral portion of the annular portion 14. Therefore, the swelling in the outer peripheral direction of the annular portion 14 can be prevented, and the annular portion 14 can be prevented from being broken even when it is pressed by the punch mechanism 30. In addition, the plastically deformed annular portion 14 can be made to efficiently flow into the coupling grooves 16. The displacement of the annular portion 14 and the shaft-like portion 17 fitted in the annular portion 14 can be prevented by the restraint ring 33, so that high-precision coupling can be performed.

Furthermore, according to this embodiment, since the restraint ring 33 is disposed in the punch mechanism 30, the restraint ring 33 can be separated from the annular portion 14 of the first metal member 11 by upwardly moving the punch mechanism 30 after the plastic flow coupling between the first metal member 11 and the second metal member 12 is completed. Accordingly, in the mass production process, the attachment/detachment of the restraint ring 33 can be automatically performed, and high-precision and high-strength coupling between the annular portion 14 and the shaft-like portion 17 can be performed by using the restraint ring 33 without requiring time and effort to attach/detach the restraint ring 33. Therefore, stable productivity of coupling members can be attained even in the mass production process.

Next, another embodiment will be described.

For example, with respect to a part used under a high-temperature and vibration environment such as an engine part or the like, the fastening force between the first metal member 11 at the outside and the second metal member 12 at the inside is reduced due to the difference in thermal expansion at high temperature, and reduction in endurance strength in the rotational direction appears in some part thereof. This is because the annular portion 14 of the first metal member 11 is thin-walled, and thus the annular portion 14 swells outwards upon an input load in the rotational direction, so that the material flowing into the coupling groove 16 is not sheared, but overrides the coupling grooves 16.

The depth of the coupling grooves 16 is normally set to about 0.1 mm. However, the coupling grooves 16 of this embodiment are formed to be further deeper by about 0.1 mm, for example, so that the depth of the coupling grooves 16 is doubled to about 0.2 mm.

As shown in FIGS. 9A and 9B, a steel ring (ring member) 91 formed of a material which has a smaller thermal expansion coefficient than at least the annular portion 14 and has higher rigidity than the annular portion 14 is fitted to the outer peripheral side of the annular portion 14.

Figure 9:
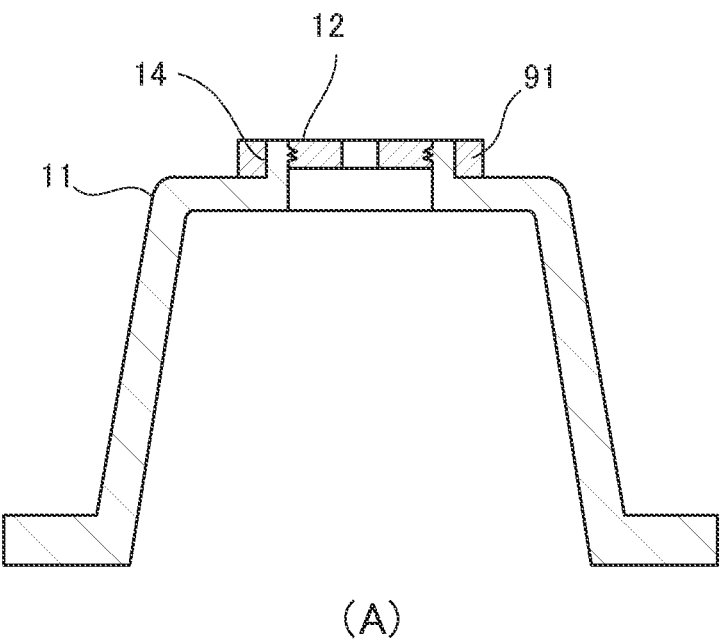
FIG. 9 is a diagram corresponding to FIG. 6 in another embodiment, wherein A is a cross-sectional view showing metal members coupled according to the other embodiment, and B is an enlarged cross-sectional view showing a part of the second metal member.
Figure 9:
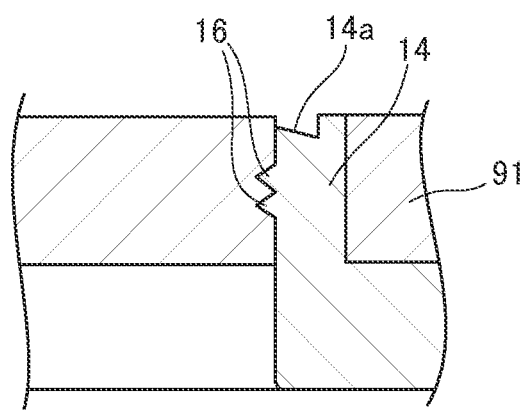

When this metal member coupling structure is adopted, the restraint ring 33 is disposed on the outer peripheral portion of the steel ring 91 in the metal member coupling device 20 shown in FIGS. 2, 3 and 5. In FIG. 9, the same parts as shown in FIG. 6 are represented by the same reference numerals, and the description thereof is omitted.

According to this embodiment, for example, the steel ring 91 formed of the material which is smaller in thermal expansion coefficient than at least the annular portion 14 is fitted to the outer periphery of the annular portion 14. Therefore, even when this metal member coupling structure is applied to a part used under a high-temperature and vibration environment such as an engine part or the like, the reduction of the fastening force caused by the difference in thermal expansion between the first metal member 11 and the second metal member 12 under high temperature can be suppressed. At this time, when the steel ring 91 and the second metal member 12 are substantially equal to each other in thermal expansion coefficient, this is the optimum condition. Furthermore, the steel ring 91 is formed of the material having higher rigidity than the annular portion 14, and thus the steel ring 91 protects the annular portion 14 from the outside thereof. Therefore, the outward swelling of the annular portion 14 under fastening can be suppressed, and the endurance of the metal member coupling structure can be secured. Furthermore, since the steel ring 91 has a high elastic coefficient and high strength, the fastening force can be enhanced at even normal temperature.

In metal member coupling structure articles based on this embodiment, the steel ring 91 is left with being fitted to the outer periphery of the annular portion 14.

Figure 10:
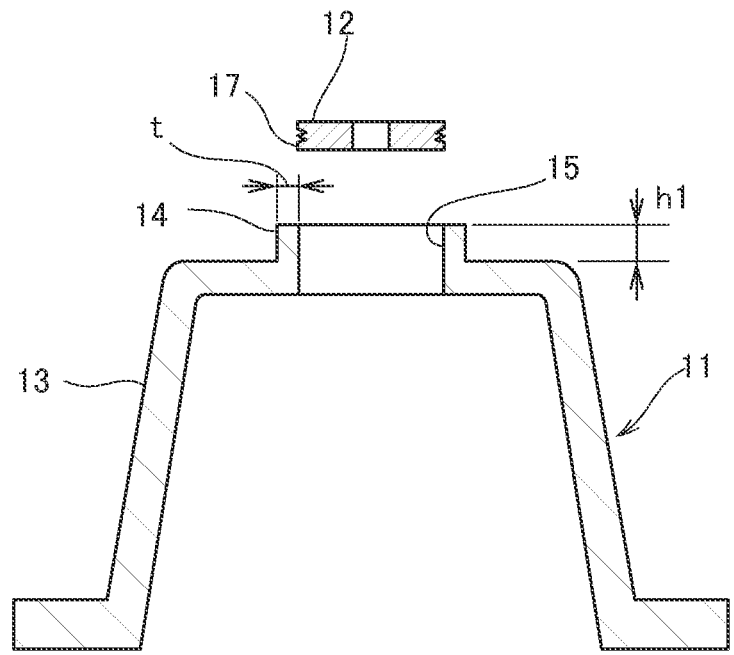
FIG. 10 is a diagram corresponding to FIG. 1 in another embodiment, wherein A is a cross-sectional view showing a first metal member and a second metal member, B is an enlarged cross-sectional view showing a part of the second metal member, and C is a plan view showing the second metal member.
Figure 10:
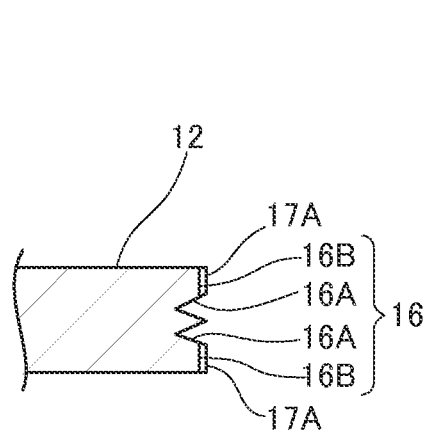
Figure 10:
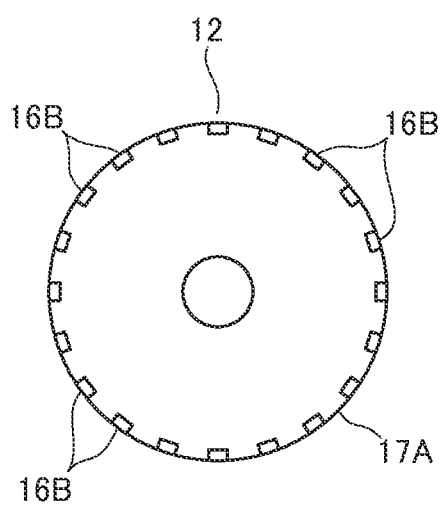

FIGS. 10A to 10C show another embodiment. In FIG. 10, the same parts as shown in FIG. 10 are represented by the same reference numerals, and the description thereof is omitted.

In this embodiment, the coupling grooves 16 are formed on the outer peripheral portion of the shaft-like portion 17 of the second metal member 12. The coupling grooves 16 comprise lateral grooves 16A extending over plural streaks in the peripheral direction of the shaft-like portion 17, and plural longitudinal grooves 16B which are formed on land portions 17A at the upper and lower sides of the lateral grooves 16A so as to extend in the axial direction and arranged so as to be spaced from one another in the peripheral direction.

According to this construction, not only the lateral grooves 16A extending in the peripheral direction, but also the plural longitudinal grooves 16B like tooth grooves are formed on the outer periphery of the shaft-like portion 17. Therefore, even when the metal member coupling structure is applied to a part in which the rotational force in the peripheral direction greatly acts on the shaft-like portion 17, the plastic flow is also applied to the longitudinal grooves 16B, whereby the plastic flow portion to the longitudinal grooves 16B function as a stopper for stopping the rotation in the peripheral direction and thus the coupling strength is enhanced. The longitudinal grooves 16B are formed on the land portions 17A at the upper and lower sides of the lateral grooves 16A. However, the present invention is not limited to this embodiment. The longitudinal grooves 16B may be formed on any one of the land portions 17A.

The present invention has been described on the basis of the embodiments, however, the present invention is not limited to these embodiments. The magnitude of the load applied to the punch 36, the stroke and press time of the punch 36 to the annular portion 14, the number of the coupling grooves 16, the depth of the grooves, and other detailed constructions may be arbitrarily changed in accordance with the constructions of the annular portion 14 of the first metal member 11 and the shaft-like portion 17 of the second metal member 12.

DESCRIPTION OF REFERENCE NUMERALS 11 first metal member
12 second metal member
14 annular portion
16 coupling groove
16A lateral groove
16B longitudinal groove
17 shaft-like portion
17A land portion
20 metal member coupling device
23 restraint ring
24 punch
91 steel ring (ring member)

The invention claimed is:
1. A metal member coupling device comprising:
a die mechanism for holding a first metal member having an annular portion and a second metal member containing a shaft-like portion having a coupling groove on an outer peripheral portion thereof under a state that the shaft-like portion of the second metal member is fitted in the annular portion of the first metal member;
a restraint ring disposed on an outer peripheral portion of the annular portion of the first metal member; and a punch mechanism for pressing the annular portion under a state that the outer peripheral portion of the annular portion of the first metal member is restrained by the restraint ring, wherein the annular portion is pressed and plastically deformed by the punch mechanism to make the annular portion flow into the coupling groove of the shaft-like portion, whereby the first metal member and the second metal member are coupled to each other through mechanical engagement therebetween, and wherein a ring member having a smaller thermal expansion coefficient and higher rigidity than the annular portion is fitted to the outer periphery of the annular portion, and the restraint ring is disposed on an outer peripheral portion of the ring member.

2. The metal member coupling device according to claim 1, wherein the restraint ring is disposed in the punch mechanism.

3. The metal member coupling device according to claim 2, wherein the coupling groove comprises lateral grooves extending over plural streaks in a peripheral direction of the shaft-like portion, and a plurality of longitudinal grooves that are formed on a land portion so as to extend in an axial direction and arranged so as to be spaced from one another in the peripheral direction.

4. The metal member coupling device according to claim 1, wherein the coupling groove comprises lateral grooves extending over plural streaks in a peripheral direction of the shaft-like portion, and a plurality of longitudinal grooves that are formed on a land portion so as to extend in an axial direction and arranged so as to be spaced from one another in the peripheral direction.

5. A metal member coupling device comprising:
a die mechanism for holding a first metal member having an annular portion and a second metal member containing a shaft-like portion having a coupling groove on an outer peripheral portion thereof under a state that the shaft-like portion of the second metal member is fitted in the annular portion of the first metal member;
a restraint ring disposed on an outer peripheral portion of the annular portion of the first metal member; and
a punch mechanism for pressing the annular portion under a state that the outer peripheral portion of the annular portion of the first metal member is restrained by the restraint ring, wherein
the annular portion is pressed and plastically deformed by the punch mechanism to make the annular portion flow into the coupling groove of the shaft-like portion, whereby the first metal member and the second metal member are coupled to each other through mechanical engagement therebetween, wherein
the restraint ring has a height set to be higher than a height of at least the annular portion, disposed at the outer periphery of the annular portion of the first metal member, and configured to restrain a spread of the annular portion in an outer peripheral direction,
the punch mechanism is configured to be upwardly and downwardly movable and comprises a punch pressing the annular portion,
the restraint ring is held by the punch mechanism and disposed at an outer peripheral portion of the punch of the punch mechanism, the restraint ring being engagedly fitted along the outer periphery of the annular portion when the punch mechanism is downwardly moved, and
a ring member having a smaller thermal expansion coefficient and higher rigidity than the annular portion is fitted to the outer periphery of the annular portion, and the restraint ring is disposed on an outer peripheral portion of the ring member.

6. The metal member coupling device according to claim 5, wherein the coupling groove comprises lateral grooves extending over plural streaks in a peripheral direction of the shaft-like portion, and a plurality of longitudinal grooves that are formed on a land portion so as to extend in an axial direction and arranged so as to be spaced from one another in the peripheral direction.

7. A metal member coupling device comprising:
a die mechanism for holding a first metal member having an annular portion and a second metal member containing a shaft-like portion having a coupling groove on an outer peripheral portion thereof under a state that the shaft-like portion of the second metal member is fitted in the annular portion of the first metal member;
a restraint ring disposed on an outer peripheral portion of the annular portion of the first metal member; and
a punch mechanism for pressing the annular portion under a state that the outer peripheral portion of the annular portion of the first metal member is restrained by the restraint ring,
wherein the annular portion is pressed and plastically deformed by the punch mechanism to make the annular portion flow into the coupling groove of the shaft-like portion, whereby the first metal member and the second metal member are coupled to each other through mechanical engagement therebetween, wherein
the punch mechanism comprises a work press, a press member and a punch, the punch being disposed separate from the work press,
the die mechanism comprises an outer die that presses the first metal member to the work press in an axial direction and an inner die that presses the second metal member to the press member in the axial direction, the outer die and the inner die relatively positioning the first metal member and the second metal member in the axial direction,
an outer diameter of the shaft-like portion of the second metal member is set to substantially a same diameter as an opening portion formed at the annular portion of the first metal member, and
the first metal member and the second metal member are disposed on the outer die and the inner die, respectively, the shaft-like portion of the second metal member being fitted in the annular portion of the first metal member and an axial center of the annular portion and an axial center of the shaft-like portion being coincident with each other.

8. The metal member coupling device according to claim 7, wherein a ring member having a smaller thermal expansion coefficient and higher rigidity than the annular portion is fitted to the outer periphery of the annular portion, and the restraint ring is disposed on an outer peripheral portion of the ring member.

9. The metal member coupling device according to claim 8, wherein the coupling groove comprises lateral grooves extending over plural streaks in a peripheral direction of the shaft-like portion, and a plurality of longitudinal grooves that are formed on a land portion so as to extend in an axial direction and arranged so as to be spaced from one another in the peripheral direction.

10. The metal member coupling device according to claim 7, wherein the coupling groove comprises lateral grooves extending over plural streaks in a peripheral direction of the shaft-like portion, and a plurality of longitudinal grooves that are formed on a land portion so as to extend in an axial direction and arranged so as to be spaced from one another in the peripheral direction.

* * * * *